United States Patent [19]

Woziekonski et al.

[11] Patent Number: 5,383,699
[45] Date of Patent: Jan. 24, 1995

[54] FOLDING VEHICLE SEAT ASSEMBLY WITH SELF ADVANCING BACKREST

[75] Inventors: Wojciech Woziekonski, Detroit; Steven D. Gulda, White Lake Township, both of Mich.

[73] Assignee: Lear Seating Corporation, Southfield, Mich.

[21] Appl. No.: 151,303

[22] Filed: Nov. 12, 1993

[51] Int. Cl.⁶ .............................................. B60N 2/04
[52] U.S. Cl. ..................................... 296/65.1; 297/15; 297/378.12
[58] Field of Search ................... 296/65.1, 69; 297/15, 297/378.12, 378.14

[56] References Cited

U.S. PATENT DOCUMENTS

| | | | |
|---|---|---|---|
| 3,880,464 | 4/1975 | Murphy et al. | 297/326 |
| 4,484,779 | 11/1984 | Suzuki | 297/326 |
| 4,606,577 | 8/1986 | Hirama et al. | 297/331 |
| 4,627,656 | 12/1986 | Gokimoto et al. | 296/65.1 |
| 4,869,541 | 9/1989 | Wainwright | 296/65.1 |
| 4,925,229 | 5/1990 | Siebler | 296/65.1 |
| 4,979,772 | 12/1990 | Carey et al. | 296/69 X |
| 5,022,698 | 6/1991 | Butt et al. | 296/65.1 |
| 5,154,476 | 10/1992 | Haider | 297/378.12 X |

Primary Examiner—Dennis H. Pedder
Attorney, Agent, or Firm—Reising, Ethington, Barnard, Perry & Milton

[57] ABSTRACT

The present invention is a foldable vehicular seat assembly (14) for providing increased floor space within a vehicle (10). The seat assembly (14) includes a seat portion (16) and backrest (18) both movable between an occupant upright seating or receiving position and a folded position. A linkage (46) and latch assembly (40) unlock both the seat portion (16) and backrest (18) from the upright seating position while simultaneously initiating the movement of the backrest (18) toward the folded position thereby assisting in the folding of the seat assembly (14).

14 Claims, 5 Drawing Sheets

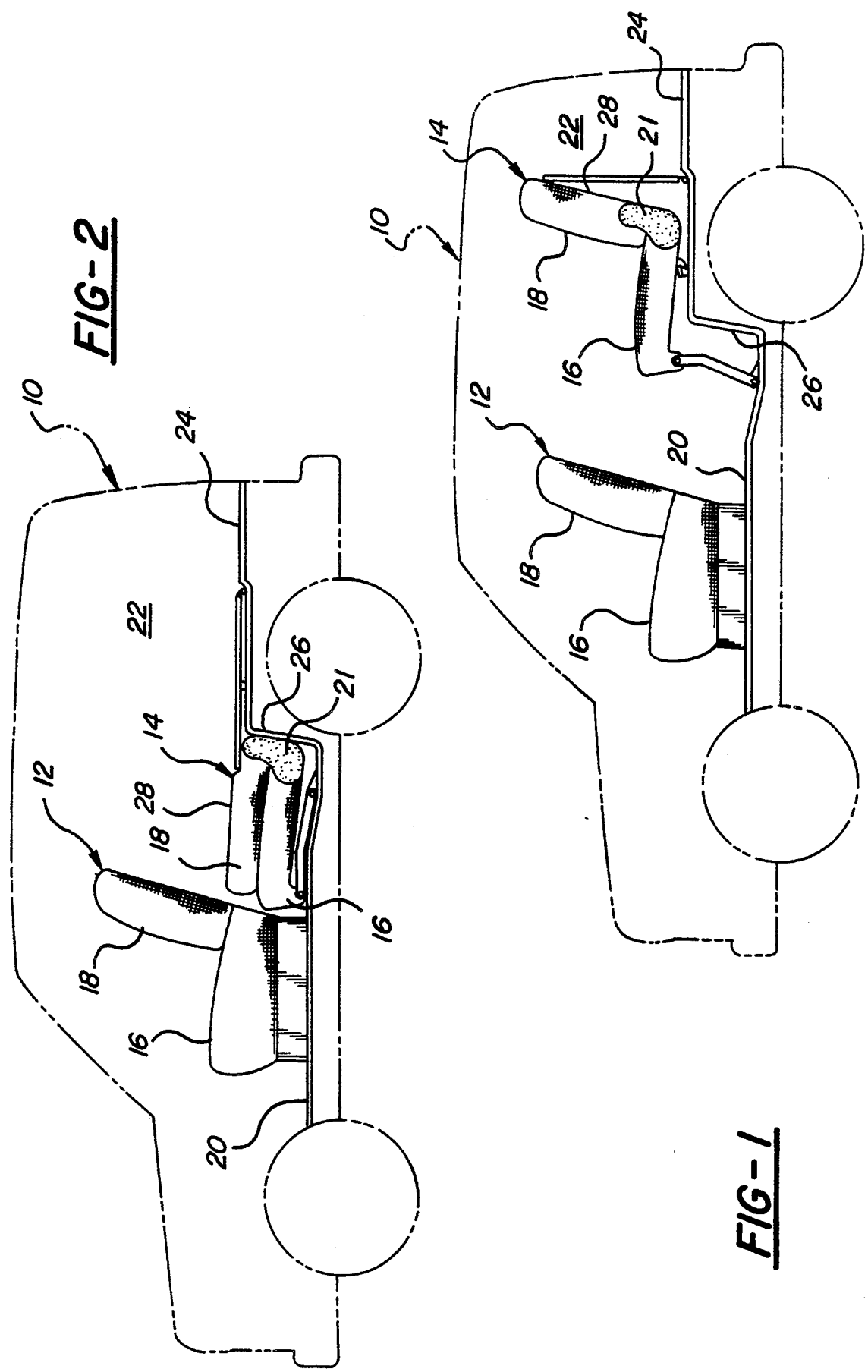

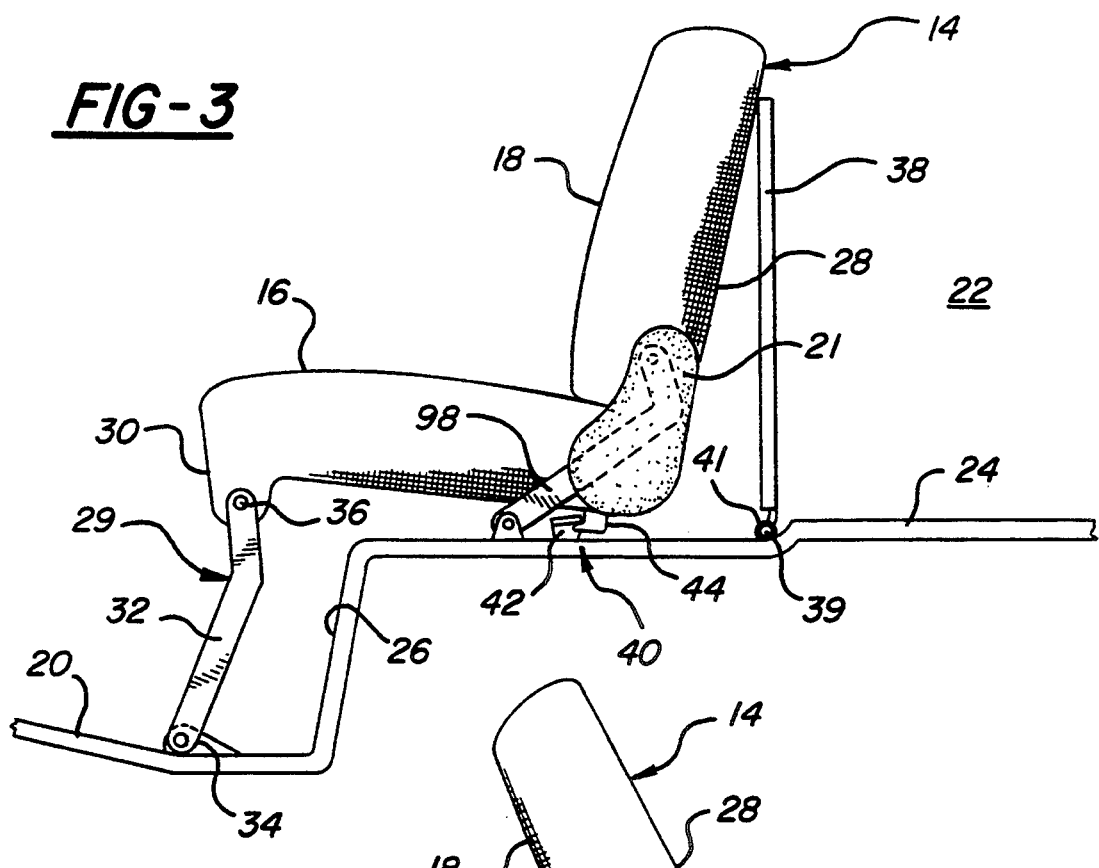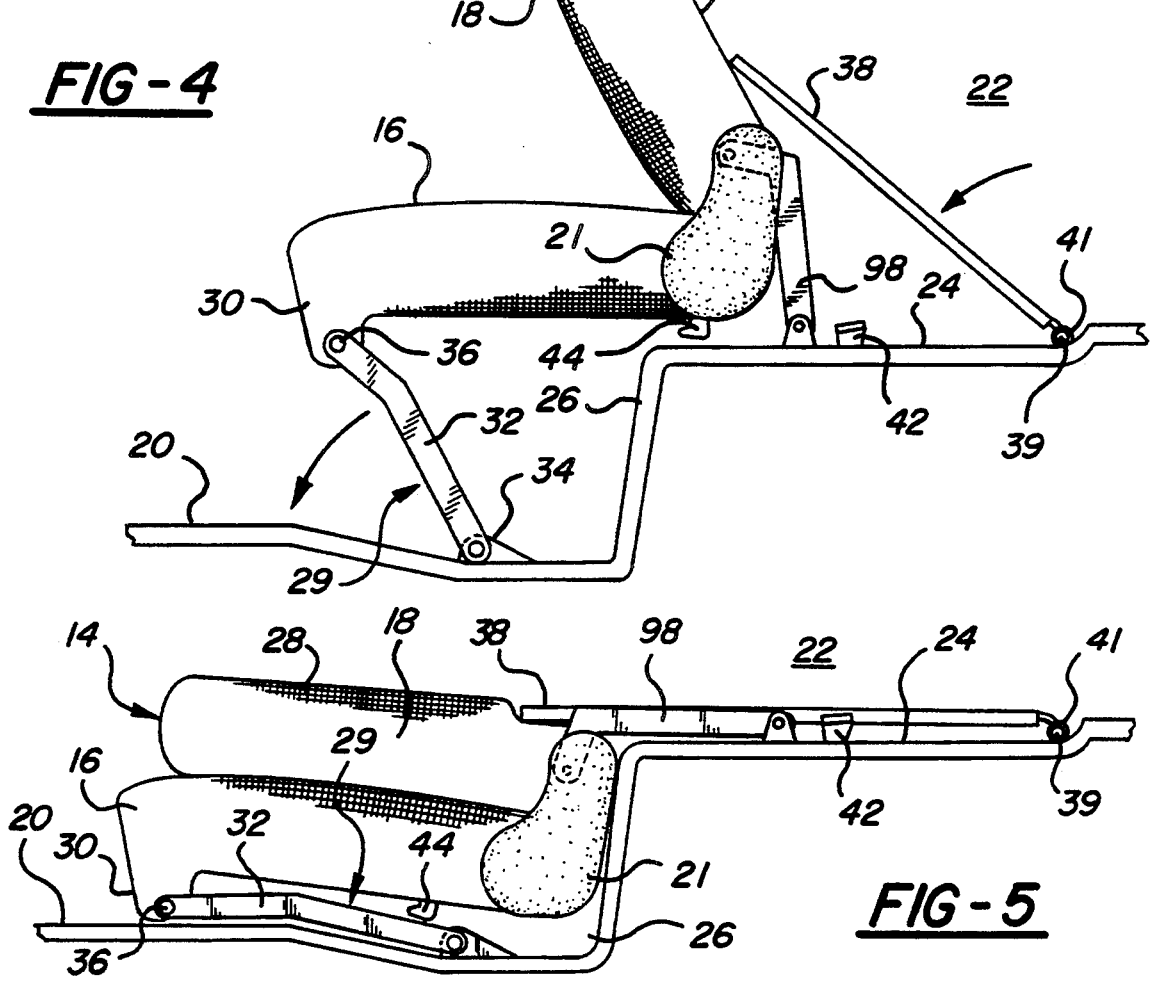

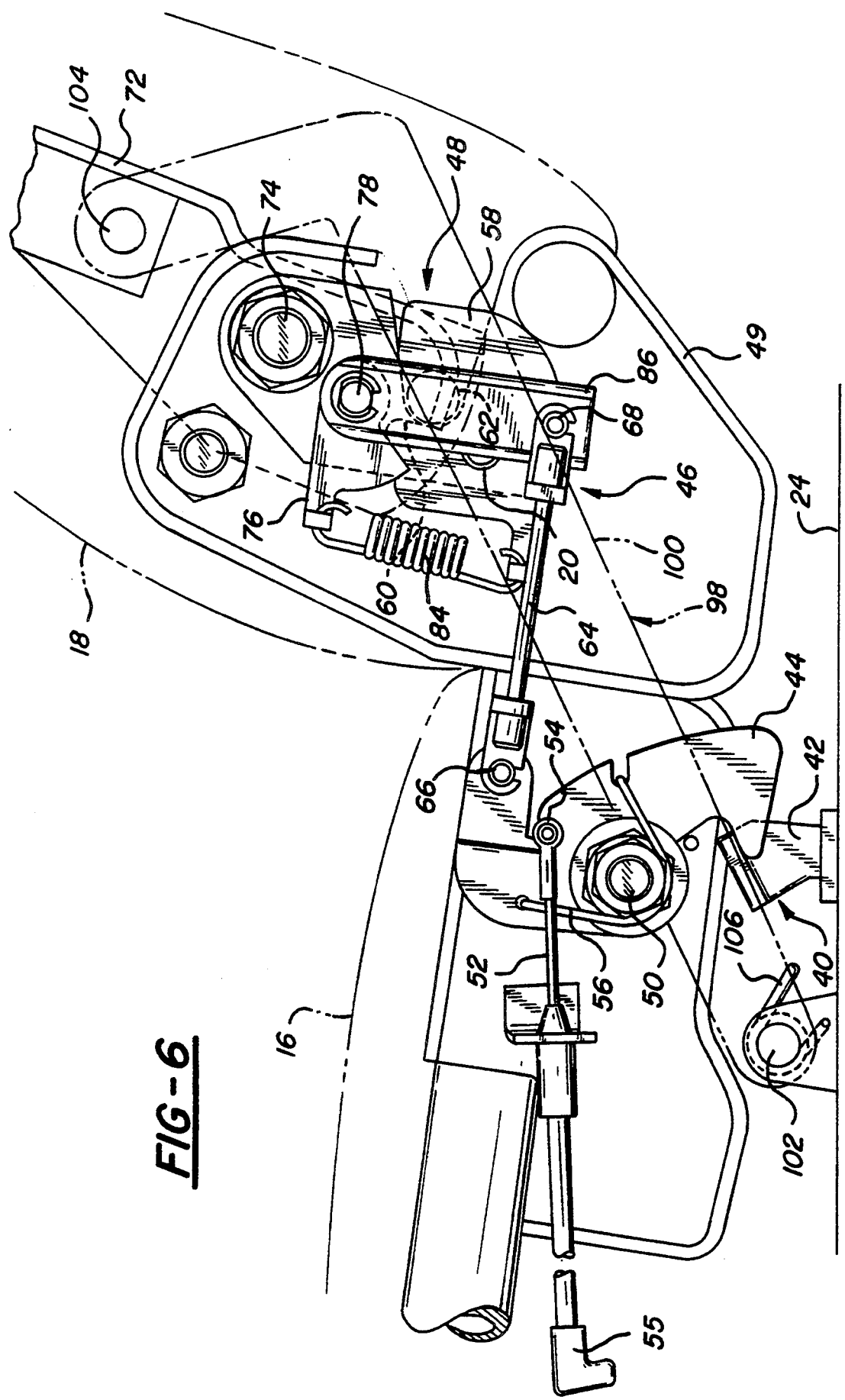

FOLDING VEHICLE SEAT ASSEMBLY WITH SELF ADVANCING BACKREST

BACKGROUND ART

1. Technical Field

The subject invention relates to vehicular seat assembly movable between an upright seating or occupant receiving position to a folded position for providing additional floor space within a vehicle.

2. Background of the Invention

Consumer demand for more versatile vehicular seating assemblies has been the focus of recent development. For example, many recreation vehicles and vans have increasingly incorporated removable and retractable seating assemblies which can be adapted between a number of various seating configurations including those which increase the cargo and floor space area within a vehicle. For example, U.S. Pat. Nos. 5,022,698 to Butt et al.; 4,925,229 to Siebler; 4,484,779 to Suzuki; 4,606,577 to Hirama et al.; 4,869,541 to Wainwright; 3,880,464 to Murphy et al.; and 4,627,656 to Gokimoto et al. all disclose seat assemblies which include latch mechanisms which unlock the seat portion of a seat assembly from a vehicle and which also cooperate with the backrest of the seat assembly in order to permit folding of the seat assembly.

Although many seat assemblies of the prior art include latch mechanisms which simultaneously unlock both the seat portion and backrest of a seat assembly, such assemblies still require substantial physical manipulation to fold the seat assembly to a retracted or stored position. Thus, a folding vehicular seat assembly which is more easily manipulated between folded and occupant receiving positions is desired.

SUMMARY OF THE INVENTION AND ADVANTAGE

In accordance with the present invention, there is provided a vehicular seat assembly movable between an occupant receiving position to a folded position for providing increased floor space within a vehicle. The assembly includes a seat portion pivotally secured to the floor of the vehicle and movable between an occupant receiving position and folded position. The seat assembly further includes a latch assembly movable between a locked and unlocked position for selectively locking the seat portion in the occupant receiving position. A backrest is pivotally connected to the seat portion and is movable between an upright position and folded position. A backrest locking assembly is provided for locking the backrest portion in the upright position. A linkage assembly is provided for interconnecting the latch assembly with the backrest locking assembly for simultaneously unlocking the backrest from the upright position when the seat portion is unlocked from the occupant receiving position. The seat assembly is characterized by including folding means for initiating movement of the backrest from the upright position toward the folded position when the seat portion is unlocked from the occupant receiving position, thereby assisting in folding of the seat assembly.

The advantage associated with the subject invention is the ability to fold the seat assembly by unlatching the lock. The need to move to a location to increase the mechanical advantage when folding the seat, i.e., someone moving behind the seat to push it forward, is obviated making the seat assembly more user friendly.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a side view of the subject seat assembly shown within a vehicle wherein the seat assembly is in an occupant receiving position;

FIG. 2 is a side view of the subject seat assembly within a vehicle wherein the seat assembly is a folded position;

FIG. 3 is an enlarged side view of the subject seat assembly shown locked in an occupant receiving position;

FIG. 4 is an enlarged side view of the subject seat assembly shown in transition between an occupant receiving position and a folded position;

FIG. 5 is an enlarged side view of the subject seat assembly shown in a folded position;

FIG. 6 is an enlarged side view of the subject seat assembly showing the latch assembly, linkage assembly, and backrest locking assembly;

DETAILED DESCRIPTION OF THE INVENTION

Figure 7:
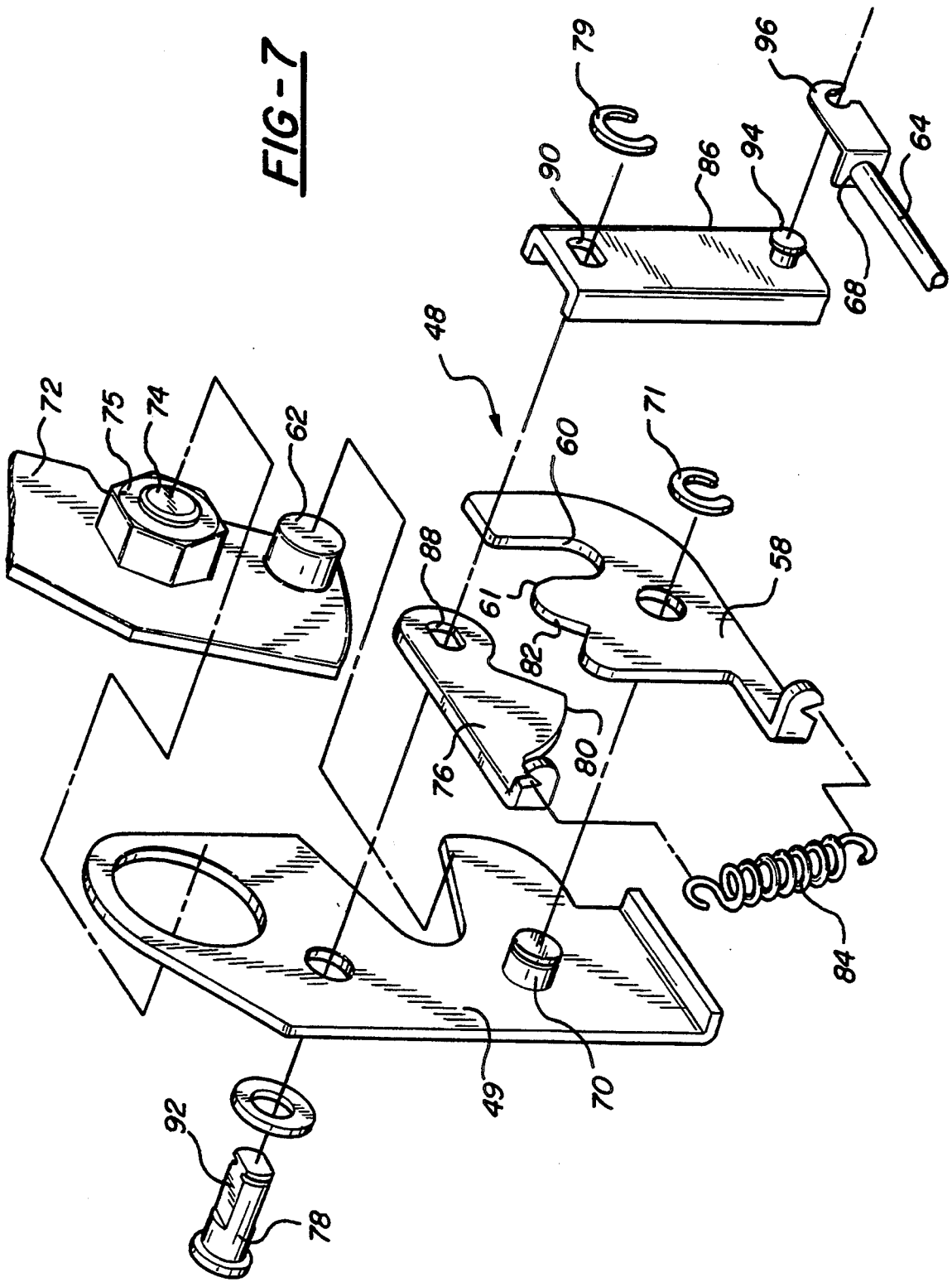
FIG. 7 is an exploded view of the backrest locking assembly.

Referring to the Figures wherein like numerals indicate like or corresponding parts throughout the several views, and more particularly with reference to FIGS. 1 and 2, a vehicle is shown generally indicated in phantom at 10 including both front and rear seat assemblies, generally indicated at 12 and 14, respectively. The seat assemblies 12, 14 include a substantially horizontally oriented seat portion 16 and a backrest 18 pivotally secured thereto. The specific means used for pivotally securing the backrest 18 to the seat portion 16 are hidden in FIGS. 1–5 by a hinge cover 19, but are fully described below with reference to FIGS. 6–9. The seat assemblies 12,14 are secured to the main floor 20 of the vehicle 10, as described in more detail below.

In the preferred embodiment of the invention, the vehicle 10 includes a rear cargo area indicated at 22. The cargo area 22 includes a floor 24 which is preferably raised above the main floor 20 of the vehicle 10, thus forming a step 26, as shown in FIGS. 1 and 2.

For the purposes of this description, the seat assembly of the present invention will be described with reference to the rear seat assembly 14, as shown in FIGS. 1 and 2; however, it will be appreciated by those skilled in the art that the subject seat assembly is not limited to a particular placement within a vehicle.

The subject seat assembly 14 is movable between an occupant receiving position, as shown in FIG. 1, and a folded position, as shown in FIG. 2. In the occupant receiving position, the seat portion 16 is oriented substantially horizontally and is secured in a position spaced above and parallel to the main floor 20. The backrest 18 is in a upright position, substantially perpendicular to the seat portion 16. In the folded position, the backrest 18 of the seat assembly 14 is pivoted forward to a substantially horizontal orientation, parallel to and directly above the seated portion 16. The seated portion 16 is moved downward to abut against the main floor 20 of the vehicle 10 and to abut against the step 26. Thus, when in the folded position, the rear side 28 of the backrest 18 forms a floor surface providing additional cargo area 22 in the vehicle 10.

The subject seat assembly 14 is shown in greater detail in FIGS. 3–5. FIG. 3 shows the seat assembly 14 in the occupant receiving position. The seat assembly 14 is pivotally secured and supported to the main floor 20 of the vehicle 10 by a support means generally indicated at 29. More specifically, the front 30 of the seat portion 14 is pivotally secured to the main floor 20 of the vehicle 10 by a pivot arm 32. The pivot arm 32 is pivotally connected to the main floor 20 of the vehicle 10 by a hinge 34 and is pivotally connected to the front 30 of the seat portion 16 by a second hinge 36.

A floor extension member 38 is pivotally secured to the floor 24 of the vehicle 10 by a hinge 39. The floor extension member 38 is movable between a substantially vertical orientation when the backrest 18 is in the upright position (as shown in FIG. 3) and a substantially horizontal position when the backrest 18 is in the folded position (as shown in FIG. 5). When in the folded position, the floor extension member 38 provides an extended floor surface in the cargo area 22 of the vehicle 10. The floor extension member 38 is preferably spring biased to urge the backrest 18 from the upright position to the folded position. For example, the hinge 39 may include a helical torsion spring 41 for biasing the floor extension member 38 in a counter-clockwise direction (with reference to FIGS. 3–5).

The seat assembly 14 includes a latch assembly, generally shown at 40, which is movable between locked and unlocked positions for selectively locking the seat portion 16 in the occupant receiving position. The latch assembly includes a latch loop 42 fixed to the floor 24 of the vehicle 10 and a latch arm 44 secured to the seat portion 16 for selectively engaging the latch loop 42 to lock and unlock the seat portion 16 in the occupant receiving position. The latch assembly 40 further includes a latch release (not shown in FIGS. 3–5 but described in detail below), for unlocking the latch arm 44 from the latch loop 42 at a remote location. Typically, the latch release is located adjacent the front 30 of the seat portion 16.

With reference to FIG. 4, the seat assembly 14 is shown with the latch arm 44 unlocked from the latch loop 42 with the seat assembly 14 located in an intermediate or transitional position between the occupant receiving position and the folded position. As indicated by the direction of the arrows in FIG. 4, once the seat assembly 14 is unlocked from the occupant receiving position, it may be manually moved forward and downward. More specifically, the seat portion 16 is rotated about the hinge 34 mounted to the main floor 20 of the vehicle while maintaining a substantially horizontal orientation. Once the seat assembly 14 is unlocked from the occupant receiving position, the backrest 18 is free to pivot relative to the seat portion 16 from the upright position to the folded position. Such rotation of the backrest 18 causes the floor extension member 38 to correspondingly rotate in a counter-clockwise direction about hinge 39, that is, from a substantially vertical orientation to a substantially horizontal orientation.

FIG. 5 shows the seat assembly 14 in the folded portion wherein the seat portion 16 rest adjacent the main floor 20 of the vehicle 10 at a location adjacent the step 26. The floor extension member 38 is positioned in a substantially horizontal orientation as is the backrest 18. The rear side 28 of the backrest forms a floor surface substantially co-planar with the floor extension member 38 and cargo floor 24. Thus, the floor space of the cargo area 22 is increased as a result of moving the seat assembly 14 from the occupant receiving position to the folded position.

With reference to FIG. 6, a portion of the seat assembly 14 and hinge cover 21 are removed to show the latch assembly 40, a linkage assembly 46, and backrest assembly 48. More specifically, the latch assembly 40 is shown including the latch arm 44 locked within the latch loop 42 for securing the seat portion 16 to the floor 24 of the vehicle 10. The latch arm 44 is pivotally mounted to the seat portion 16 by a pivot connector 50. A cable assembly 52 is connected at one end 54 to the latch arm 44 and at the other end to a latch release 55. By pulling the latch release 55, the cable 52 is displaced thus causing the latch arm 44 to rotate in a counter-clockwise direction with reference to FIG. 6, thereby unlocking the latch arm 44 from the latch loop 42. The latch arm 44 is spring biased in a clockwise direction by a helical torsion spring 56. Thus, the force required to rotate the latch arm 44 in a counter-clockwise direction to unlock the latch arm 44 from the latch loop 42 must be greater than the biasing force of the helical torsion spring 56. When the latch release 55 is released, the torsion spring 56 rotates the latch arm 44 back to a locked position.

The backrest locking assembly 48 locks the backrest 18 in the upright position, as shown in FIG. 6. The backrest locking assembly 48 includes a backrest plate 49 secured to the seat assembly 14. The backrest locking assembly 48 further includes a catch 58 pivotally secured to the backrest plate 49. The catch 58 includes a U-shaped portion 60 for receiving a backrest post 62 extending from the backrest 18. The catch 58 is movable between a locked position (as shown in FIG. 6) wherein the backrest post is disposed within the U-shaped portion 60, and an unlocked position wherein the backrest post is urged out of the U-shaped portion 60. The backrest locking assembly 48 is described in detail below with reference to FIGS. 7–9.

The linkage assembly 46 includes a linkage arm 64 secured at one end 66 to the latch arm 44 and at the other end 68 to the backrest locking assembly 48. Although a rigid latch arm 44 is preferred, other linkage means may be employed, including push-pull cable assemblies.

As will be described in detail below, actuation of the latch release 55 causes the latch arm 44 to rotate in a counter-clockwise direction thus unlocking the latch arm 44 from the latch loop 42 and thereby unlocking the seat portion 16 from the floor 24 of the vehicle 10. While unlocked, the seat portion 16 may be moved to the folded position by manually rotating the seat portion 16 about hinged joints 34, 36, as shown in FIGS. 4 and 5. Actuation of latch release 55 simultaneously causes the catch 58 of the backrest locking assembly 48 to move from a locked position to an unlocked position, thus permitting the backrest 18 to move from an upright position to a folded position.

With reference to FIG. 7, the backrest locking assembly is generally shown at 48. The assembly 48 includes the backrest plate 49 along with a catch 58 pivotally secured thereto by a pivot pin 70 and clip 71. The catch 58 includes a U-shaped portion 60 and a camming surface 61. The backrest 18 of the seat assembly 14 includes a frame 72 pivotally secured to the seat assembly 14 by way of a pivot pin 74 and nut 75, as is common in the art. A backrest post 62 extends from the backrest frame 72 and rests with the U-shaped portion 60 of the catch 58 for locking the backrest 18 in the upright position, as will be described subsequently.

With continuing reference to FIG. 7, the backrest locking assembly also includes a lock member 76 pivotally secured to the backrest plate 49 by a pivot pin 78 and clip 79. A locking finger 80 extends from the lock member 76 for engaging with a corresponding notch 82 formed in the catch 58 for preventing rotation of the catch 58 about the pivot pin 70. The catch 58 and lock member 76 are interconnected by a biasing member 84, preferably a spring.

One end 68 of the linkage arm 64 is secured to the backrest locking assembly 48. More specifically, the backrest locking assembly 48 includes a linkage lever 86 which is pivotally secured to the backrest plate 49 about pivot pin 78. The linkage lever 86 and lock member 76 are both pivotally secured to the backrest plate 49 by the pivot pin 78 and clip 79 in such a manner that rotation of the linkage lever 86 causes a corresponding rotation of the lock member 76. More specifically, the lock member 76 and linkage arm 86 both include a corresponding non-circular apertures therethrough, shown at 88, 90 respectively, for receiving a corresponding non-circular section 92 of the pivot pin 78. Once the pivot pin 78 is inserted through the apertures 88, 90 of the lock member 76 and linkage lever 86, the lock member 76, linkage lever 86, and pivot pin 78 rotate together about a common axis. The linkage lever 86 includes an attachment pin 94 extending therefrom for providing attachment with the linkage arm 64. More specifically, the linkage arm 64 includes hook member 96 adapted for attachment about the attachment pin 94 of the linkage arm 64, thus interconnecting the linkage arm 64 with the lock member 76.

Figure 8:
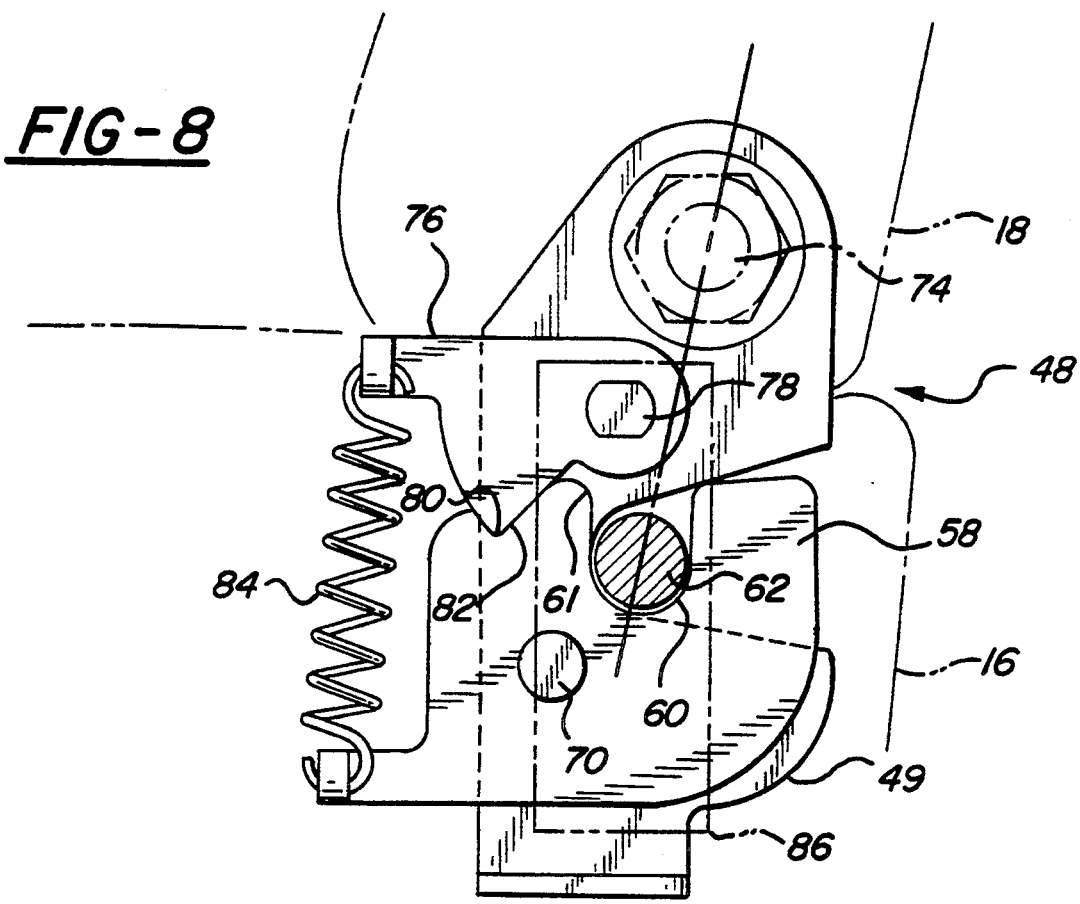
FIG. 8 is an enlarged side view of the backrest locking assembly shown in a locked position.
Figure 9:
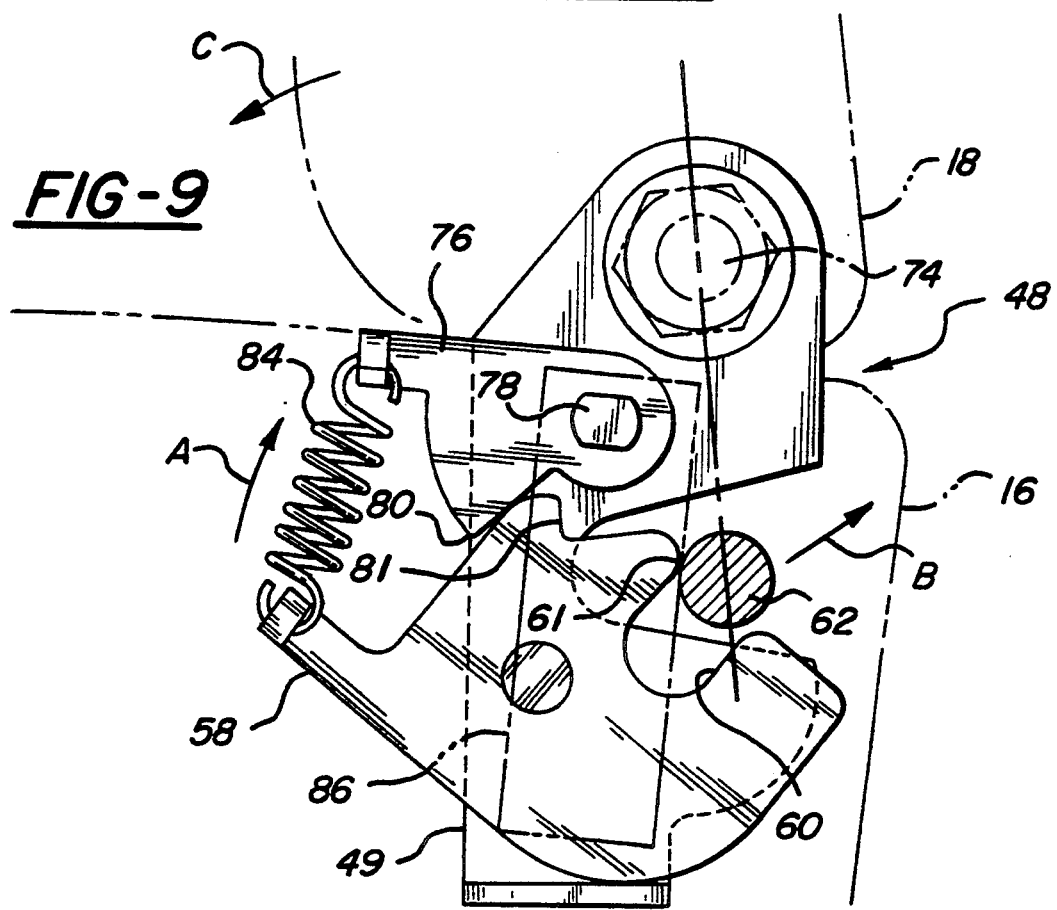
FIG. 9 is an enlarged side view of the backrest locking assembly shown in an unlocked position.

The backrest locking assembly 48 is shown in greater detail in FIGS. 8 and 9. FIG. 8 shows the backrest locking assembly, including the catch 58, in the locked position. More specifically, the backrest post 62 is disposed within the U-shaped portion 60 of the catch 58. The lock member 76 is shown in an engaged position wherein the locking finger 80 extending therefrom is engaged within the notch 82 of the catch 58, thereby preventing rotation of the catch. In the locked position, the backrest 18 is locked in the upright position, substantially perpendicular to the seat portion 16.

The backrest locking assembly 48 is shown in the unlocked position in FIG. 9. More specifically, the linkage lever 86 and lock member 76 are shown slightly rotated in a counter-clockwise direction. Moreover, the lock member 76 is shown in a disengaged position wherein the locking finger 80 is out of engagement with the notch 82 of the catch 58. The rotation of the linkage lever 86 and lock member 76 communicate a rotational force to the catch 58 by way of the biasing member 84 which interconnects the catch 58 and lock member 76. The compression force (indicated by arrow A in FIG. 9) of the biasing member 84 causes the catch 58 to rotate in a clockwise direction about the pivot pin 70. As a result, the camming surface 61 of the catch 58 engages the backrest post 62 and initiates the post 62 to rotate in a counter-clockwise direction about the pivot means 74 (indicated by arrow B in FIG. 9). Consequently, the backrest 18 is initiated to move from the upright position to the folded position (indicated by arrow C in FIG. 9) without any independent manipulation of the seat assembly 14.

As previously indicated, the backrest locking assembly 48 includes folding means for initiating movement of the backrest 18 from the upright position, toward the folded position, when the seat portion 16 is unlocked from the occupant receiving position. The folding means includes the biasing member 84 and camming surface 61 previously described. The operation of the folding means is perhaps best appreciated when viewed in light of the totality of parts and related movement thereof associated with unlocking the seat assembly 14 from the occupant receiving position, as described below.

In operation, the seat portion 16 and backrest 18 of the seat assembly 14 are locked into the occupant receiving position (as shown in FIGS. 3 and 6) by the latch arm 44 locked about the latch loop 42. By pulling the latch release 55, the cable 52 of the cable assembly is displaced causing the latch arm 44 to rotate in a counter-clockwise direction about pivot connector 50, thereby becoming unlocked from the latch loop 42. In addition, rotation of the latch arm 44 simultaneously causes the linkage arm 64 to be displaced (from right to left in FIG. 6) thus causing the linkage lever 86 and lock member 76 to rotate (in a clockwise direction) about the pivot pin 78. Rotation of the lock member 76 is communicated to the catch 58 by the biasing member 84 connected therebetween. That is, as the lock member 76 rotates clockwise, the biasing member 84 is extended and consequently applies a tangential force upon the catch 58. This force causes the catch 58 to rotate clockwise about the pivot pin 70. As the catch 58 rotates, the camming surface 61 forces the backrest post 62 in a counter-clockwise direction about pivot pin 74, thereby initiating movement of the backrest 18 from the upright position toward the folded position. The initiation of the backrest from the upright position to the folded position occurs without any manipulation of the seat assembly 14 other than pulling the latch release 55.

In addition to the camming surface 61 and biasing member 84, the folding means may additionally include a helical torsion spring 41 working in cooperation with the hinge 39 of the floor extension member 38, as previously described. More specifically, the torsion spring 41 forces the floor extension member 38 in a counter-clockwise direction about the hinge 39, thereby assisting in the folding of the backrest 18 from the upright position to the folded position. Furthermore, the folding means preferably includes a biasing assembly 98 biased against the backrest for forcing the backrest 18 from the upright position to the folded position. One embodiment of a biasing assembly 98 is shown in FIGS. 3–6. The biasing assembly 98 includes a pivot arm 100 having a first end 102 pivotally secured to the floor 24 of the vehicle adjacent to the latch loop 42 and a second end 104 pivotally secured to the frame 72 of the backrest 18. The biasing assembly 98 includes a helical torsion spring 106 biased against the first end 102 of the pivot arm 100 which urges the pivot arm 100 to rotate in a counter-clockwise direction about the hinge 39 which results in additional forced applied upon the backrest 18 to assist in moving the backrest 18 from the upright position to the folded position.

Additional or alternative folding means may also be used. For example, a helical torsion spring may be disposed about the pivot pin 74 and biased against the backrest frame 72 in order to further urge the backrest 18 from the upright position to the folded position.

Once the seat portion 16 has been unlocked and moved to the folded position, the backrest 18 is simultaneously unlocked from the upright position and urged from the upright position to the folded position. However, the backrest 18 may be manually forced from the folded position back to the upright position. More specifically, once the latch release 55 is released (no longer actuated), the latch arm 44 returns to a locked position due to the biasing force of the helical torsion spring 56. The backrest 18 may be manually rotated about pivot pin 74 from the folded position to the upright position. By forcing the backrest to the upright position, the backrest post 62 is forced against the camming surface 61 and into the U-shaped portion 60 of the catch 58. In so doing, the catch 58 is rotated in a clockwise direction about pivot pin 70, from an unlocked position to a locked position. The rotation of the catch 58 is communicated to the lock member 76 by the biasing member 84 interconnected therebetween. Consequently, as the catch 58 rotates from the unlocked position to the locked position, the locking finger 80 of the lock member is forced into engagement with the notch 82 of the catch 58, thereby locking the backrest in the upright position.

The invention has been described in an illustrative manner, and it is to be understood the terminology used is intended to be in the nature of description rather than of limitation.

Many modifications and variations of the present invention are possible in light of the above teachings. Therefore, it is to be understood that within the scope of the appended claims, reference numerals are merely for convenience and are not to be in any way limiting, the invention may be practiced otherwise than as specifically described.

We claim:

1. A vehicular seat assembly (14) movable from an upright seating position to a folded position for providing increased floor space within a vehicle (10), said vehicular seat assembly (14) comprising:

a seat portion (16) pivotally secured to the floor (20) of the vehicle (10) and movable between an upright seating position and folded position;

a latch assembly (40) movable between a locked position and an unlocked position for selectively locking said seat portion (16) in said upright seating position and unlocking said seat portion (16) from said occupant receiving position;

a backrest portion (18) including a post (62) extending therefrom, said backrest portion (18) pivotally connected to said seat portion (16) and movable between an upright seating position and folded position;

a backrest locking assembly (48) for locking said backrest portion (18) in said upright seating position;

a linkage assembly (46) interconnecting said latch assembly (40) with said backrest locking assembly (48) for simultaneously unlocking said backrest (18) from said upright seating position as said latch assembly (40) unlocks said seat portion (16) from said upright seating receiving position;

said vehicular seat assembly (14) characterized by folding means (84, 61, 98) for applying a force to said post (62) only when said seat portion (16) is unlocked to initiate movement of said backrest (18) from said upright seating position toward said folded position when said seat portion (16) is unlocked from said occupant receiving position thereby assisting in folding of said seat assembly (14).

2. A seat assembly (14) as set forth in claim 1 further characterized by said backrest locking assembly (48) including a catch (58) for receiving said post (62), said catch (58) for receiving said post (62), said catch (58) movable between a locked position for preventing movement of said post (62) thereby locking said backrest (18) in said upright seating position and an unlocked position for permitting movement of said post (62) thereby permitting said backrest (18) to move toward said folded position.

3. A seat assembly (14) as set forth in claim 2 further characterized by said backrest locking assembly (48) further including a lock member (76) movable between an engaged position for locking said catch (58) in said locked position and a disengaged position for permitting movement of said catch (58).

4. A seat assembly (14) as set forth in claim 3 further characterized by said folding means including a biasing member (84) interconnecting said lock member (76) and said catch (58) for moving said-catch (58) between said locked and unlocked positions as said lock member (76) is moved between said engaged and disengaged positions.

5. A seat assembly (14) as set forth in claim 4 further characterized by said folding means including a camming surface (61) disposed upon said catch (58) for engaging said post (62) as said catch (58) moves from said locked position to said unlocked position thereby initiating movement of said backrest (18) from said upright seating position toward said folded position.

6. A seat assembly (14) as set forth in claim 5 further characterized by said linkage assembly (48) including a linkage arm (64) interconnecting said latch assembly (40) to said lock member (76) for moving said lock member (76) between said engaged and disengaged positions as said latch assembly (40) is moved between said locked and unlocked positions.

7. A seat assembly (14) as set forth in claim 6 wherein said latch assembly (40) includes a latch loop (42) fixed to the floor (24) of the vehicle (10), and a latch arm (44) secured to said seat portion (16) for selectively engaging said latch loop (42) to lock and unlock said seat portion (16) in said upright seating position.

8. A seat assembly (14) as set forth in claim 7 wherein said latch assembly (40) further includes a latch release (55) for unlocking said latch arm (44) from said latch loop (42) thereby permitting said seat portion (16) to move from said upright seating position to said folded position while simultaneously unlocking said backrest (12) from said upright position and initiating movement of said backrest (18) from said upright seating position toward said folded position.

9. A seat assembly (14) as set forth in claim 4 further characterized by said folding means further including a biasing assembly (98) biased against said backrest (18) for forcing said backrest (18) from said upright seating position to said folded position.

10. A seat assembly (14) as set forth in claim 9 further characterized by said biasing assembly (98) including a pivot arm (100) having a first end (102) pivotally secured to the floor (24) of the vehicle (10) and a second end (104) pivotally secured to the backrest (18) of the seat assembly (14).

11. A seat assembly (14) as set forth in claim 4 further characterized by said backrest (18) including a rear side (28), said rear side (28) defining a floor surface when said seat assembly (14) is in said folded position thereby providing additional floor space in the vehicle (10).

12. A seat assembly (14) as set forth in claim 11 further characterized by a floor extension member (38) pivotally secured to the floor (24) of the vehicle (10) and movable between a substantially vertical orientation when said backrest (18) is in said upright seating position and a substantially horizontal position when said backrest (18) is in said folded position thereby providing an extended floor surface in the vehicle (10) when said seat assembly (14) is in said folded position.

13. A seat assembly as set forth in claim 12 wherein said floor extension member (38) is spring biased to urge said backrest (18) from said upright seating position to said folded position.

14. A seat assembly as set forth in claim 11 further characterized by a support means (29) for pivotally securing said seat portion (16) to the floor (20) of the vehicle (10).

* * * * *